United States Patent
Anani et al.

[11] Patent Number: 6,117,585
[45] Date of Patent: Sep. 12, 2000

[54] HYBRID ENERGY STORAGE DEVICE

[75] Inventors: Anaba A. Anani, Lawrenceville, Ga.; Han Wu, Barrington; Keryn Ke Lian, Palatine, both of Ill.

[73] Assignee: Motorola, Inc., Schaumburg, Ill.

[21] Appl. No.: 08/900,588

[22] Filed: Jul. 25, 1997

[51] Int. Cl.[7] .................. H01M 12/02; H01M 10/02; H01M 6/02
[52] U.S. Cl. .............. 429/122; 429/7; 429/123; 429/156; 429/161; 429/9
[58] Field of Search .................... 429/9, 122

[56] References Cited

U.S. PATENT DOCUMENTS

| | | | |
|---|---|---|---|
| 3,288,641 | 11/1966 | Rightmire | 136/6 |
| 3,423,642 | 1/1969 | Plehal et al. | 317/231 |
| 3,538,394 | 11/1970 | Bourgault et al. | 317/230 |
| 4,284,951 | 8/1981 | Dahl et al. | 324/430 |
| 4,830,938 | 5/1989 | McCullough | 429/149 |
| 4,900,643 | 2/1990 | Eskra et al. | 429/241 |
| 4,992,340 | 2/1991 | Tidwell et al. | 429/7 |
| 5,147,739 | 9/1992 | Beard | 429/194 |
| 5,358,798 | 10/1994 | Kleinert, III | 429/7 |
| 5,421,745 | 6/1995 | Aksoy et al. | 439/626 |
| 5,439,756 | 8/1995 | Anani et al. | 429/9 |
| 5,568,353 | 10/1996 | Bai et al. | 361/523 |
| 5,587,250 | 12/1996 | Thomas et al. | 429/3 |

FOREIGN PATENT DOCUMENTS

| | | |
|---|---|---|
| 59-14681 | 7/1984 | Japan . |
| 404006760A | 1/1992 | Japan . |
| 404043557A | 2/1992 | Japan . |
| 404294515A | 10/1992 | Japan . |
| 408111220A | 4/1996 | Japan . |
| 843035 | 6/1981 | Russian Federation . |

*Primary Examiner*—Maria Nuzzolillo
*Assistant Examiner*—Mark Ruthkosky
*Attorney, Agent, or Firm*—Felipe J. Farley; Philip H. Burrus, IV

[57] ABSTRACT

A hybrid energy storage device (10) including first, second, and third electrodes (20, 25, 30), a first electrolyte (35) disposed between the first and second electrodes (20, 25), and a second electrolyte (40) disposed between the second and third electrode (25, 30). The first electrode (25), the first electrolyte (35), and the second electrode (25) form a battery, and the second electrode (25), the second electrolyte (40), and the third electrode (30) form a capacitor. The first and third electrodes (20, 30) are directly connected together so that the battery and capacitor are in parallel within the hybrid energy storage device (10).

1 Claim, 2 Drawing Sheets

HYBRID ENERGY STORAGE DEVICE

TECHNICAL FIELD

This invention relates in general to the field of electrical energy storage devices, and more particularly to capacitors and battery cells.

BACKGROUND

Energy generation and storage in portable packages has long been a subject of study and development. Storage of electrical energy in a compact form, such as in the form of a rechargeable battery and/or capacitor that can be readily charged and discharged, is of special importance. Rechargeable energy storage devices characterized by high power and high energy are necessary to power devices that have a wide range of electrical requirements. Examples of such devices include digital communication devices, power tools, and portable computers, to name but a few. In each of these devices, the instantaneous high power that can be provided by a capacitor is occasionally needed, while the high energy that can be provided by a battery is required at other times. Although most battery technologies offer enhanced energy capability, this is generally at the expense of maximum power.

One prior art solution has been to combine an electrochemical capacitor in parallel with a battery to meet the peak power requirements of pulsed power applications. This architecture can significantly enhance battery performance in terms of talk time, low-temperature performance, and/or cycle life. Unfortunately, such a solution requires incorporation of a separate component, i.e. the electrochemical capacitor, within the battery pack. This additional component adds to the volume and the complexity of the energy storage device, and thus is not the most desirable solution.

Accordingly, there exists a need to provide a novel electrochemical device that meets the needs of modern cordless pulsed power devices in a small package without the complexity associated with prior art solutions.

DETAILED DESCRIPTION OF THE PREFERRED EMBODIMENT

Figure 1:
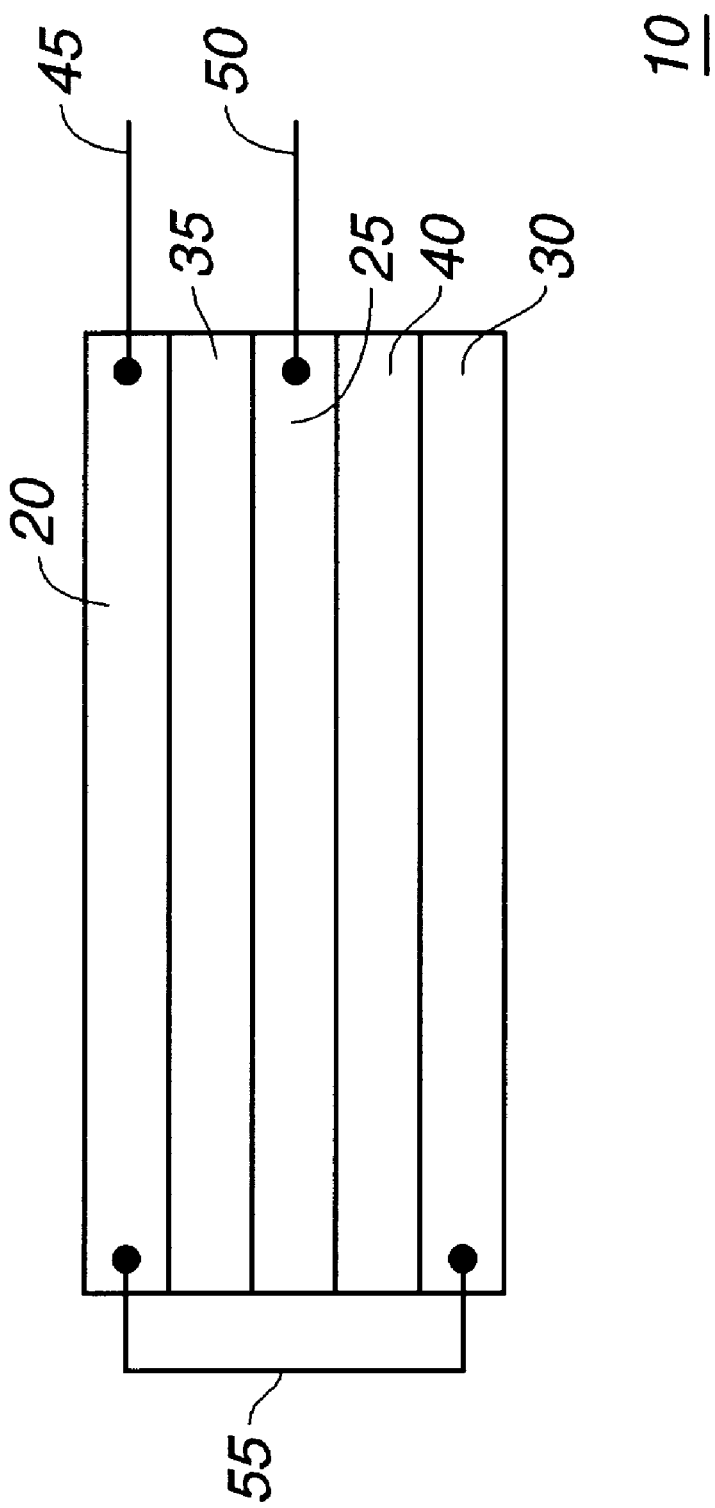
FIG. 1 is a side, schematic view of a hybrid energy storage system in accordance with the present invention.

While the specification concludes with claims defining the features of the invention that are regarded as novel, it is believed that the invention will be better understood from a consideration of the following description in conjunction with the drawing figures, in which like reference numerals are carried forward.

The present invention involves a hybrid type of electrical energy storage device that utilizes a three-electrode configuration. The three-electrode configuration provides the advantages of both a high energy cell and a high rate cell in a single two-terminal device. High-energy materials, which can be used to fabricate electrodes that are high in energy density, are typically used to make high energy cells, which are often referred to as "batteries". High-rate materials, which can be used to fabricate electrodes that are high in peak power density and rate capability, are typically used to make high rate cells, which are often referred to as "capacitors". To aid in describing and understanding the invention, electrode materials that generally exhibit the characteristics of a battery will be referred to herein as "high-energy" materials, while electrode materials that generally exhibit the characteristics of capacitors will be referred to herein as "high-rate" materials.

Examples of some popular high-energy materials that have been used as anodes in rechargeable aqueous batteries include cadmium, metal hydrides, lead and zinc, while cathodes have been fabricated from nickel oxide, lead oxide, silver, and oxygen or air (with catalyst). Examples of high-energy anode materials for Li-ion rechargeable batteries include carbon (Li-intercalating), $WO_3$, $TiS_2$, and SnOx. Corresponding cathode materials include, for instance, $Li_xNi_yO_2$, $LiCoO_2$, $LiMn_2O_2$ and $LiV_6O_{13}$, where x, y and z vary between 0.1 and 10. Other candidate high-energy materials include La, Li, Na, Al, Fe, Zn, Cd, Pb, Sn, Bi, C, V, Mn, Co, Ni, Ag, and their oxides, hydroxides, hydrides, carbides, nitride or sulfites. Still other high energy materials include polyaniline, polythiophene, polyfluorophenylthiophene, polypyrrole, n-doped or p-doped polymers, redox polymers, and mixtures thereof.

Examples of some high-rate materials that have been used in capacitors include high-surface area carbon (variously known as activated carbon, carbon black, amorphous carbon, etc.), ruthenium oxide, silver oxide, cobalt oxide, and conducting polymers (such as polyaniline, polythiophene, polyfluorophenylthiophene, n-doped or p-doped polymers, redox polymers, or polypyrrole). Other candidate high-rate materials include C, Nb, Hf, Ti, Ta, Li, Fe, Zn, Sn, Ru, Ag, Pt, Ir, Pb, Mo, W, Ni, Co, and their oxides, hydroxides, hydrides, carbides, nitrides, sulfites, or alloys, and mixtures thereof.

Referring to FIG. 1, the electrical energy storage device 10 according to the present invention comprises three electrodes 20, 25, 30. The first electrode 20, i.e., a "battery electrode", is fabricated by coating high-energy materials onto a current collecting substrate in a conventional manner, while the second electrode 30, i.e., a "capacitor electrode", is fabricated from high-rate materials coated onto a different current collecting substrate. The third electrode 25, i.e., the common electrode, is fabricated from materials that are suitable for use both in batteries and capacitors. The active material used in the common electrode 25 could, for instance, be zinc, carbon, sulfur, lead, their alloys, or combinations thereof. The battery electrode 20 is paired with the common electrode 25, and an electrolyte system 35 is disposed therebetween so that a battery is formed. The common electrode 25 is further paired with the capacitor electrode 30, and another electrolyte system 40 is disposed between the common electrode 25 and the capacitor electrode 30 so that a capacitor is formed.

According to the present invention, the battery electrode 20 and the capacitor electrode 30 are electrically coupled together within the hybrid energy storage device 10 itself. This connection can be made within a package housing the device 10 and without any intervening circuitry. In other words, a conductor 55 can be used to directly connect the current collector (not shown) of the battery electrode 20 to the current collector (not shown) of the capacitor electrode 30. The conductor 55 can be formed of any current conducting material and can be coupled to the battery and capacitor electrodes 20, 30 by any conventional means, such as by soldering, welding, or riveting. Preferably, the conductor 55 is in the form of a conductive member that is ultrasonically welded between the electrodes 20, 30.

Alternatively, when the current collectors of the battery electrode 20 and the capacitor electrode 30 are formed from the same material, the conductor 55 can simply be formed from a current collector portion that has not been coated with electroactive material. For example, in such a case, a relatively long current collecting substrate can include a coated portion at a first end to serve as the battery electrode 20 and another coated portion at the opposite end to serve as the capacitor electrode 30. Central portions of the substrate could remain uncoated to serve as the conductor 55. Thereafter, the substrate could be folded over so that the electrolyte systems 35, 40 contact the respective battery and capacitor electrode portions 20, 30.

The energy storage device 10 further comprises two terminals 45, 50. A first terminal 50 is electrically coupled to the common electrode 25 and is accessible from the exterior of the device 10. A second terminal 45 is electrically coupled either to the capacitor electrode 30 or to the battery electrode 20 (as shown) and is accessible from the exterior of the device 10. Therefore, the energy storage device 10 provides the convenience of a two-terminal device in which no external circuitry, such as switching circuitry, is needed. The advantages of both batteries and capacitors are present in the hybrid energy storage device 10 since the device 10 provides the functionality of a battery electrically coupled in parallel with a capacitor. Additionally, the hybrid device 10 is characterized by a low impedance as a result of the internal parallel connection of the battery and the capacitor.

To achieve the desired performance, the electrode materials should be appropriately paired and matched for capacity, rate capability, and voltage. These requirements are met if:

1) the common electrode 25 has enough electroactive material so that the capacity of the common electrode 25 exceeds the sum of the capacities of the battery electrode 20 and the capacitor electrode 30;

2) the voltage resulting from the pairing of the battery electrode 20 and the common electrode 25 is slightly above the operating voltage resulting from the pairing of the capacitor electrode 30 and the common electrode 25; and 3) the electroactive material of the capacitor electrode 30 is electrochemically stable at the charge voltage of the electroactive material used in the battery electrode 20.

When these criteria are met, the capacitor of the device 10 remains in a charge state except when delivering current. During charging of the hybrid device 10, such as through the terminals 45, 50, both the capacitor and the battery of the device 10 are charged simultaneously because the voltage of the battery is higher. During pulse discharge, the voltage of the battery decreases as a result of the high internal resistance of the battery electrode, and the capacitor begins to supply current to make up for the deficiency of the battery. When the pulse ends, the battery automatically recharges the capacitor because the battery charge voltage is greater than that of the capacitor. It will be appreciated that, during normal, lower current operation, current can be supplied by the capacitor and/or the battery of the hybrid energy storage device 10.

An example of a preferred embodiment of the electrical energy storage device 10 will now be set forth.

EXAMPLE

An electrical energy storage device was proposed using two known types of systems. A capacitor electrode of the device was formed from a Ni—Co alloy coated onto a nickel substrate, and a battery electrode was formed from a NiOOH material coated onto a nickel substrate. The common electrode was formed of zinc. A first electrolyte system comprising 30% KOH was disposed between the capacitor electrode and the common electrode, and a second electrolyte system also comprising 30% KOH was disposed between the battery electrode and the common electrode. The Ni—Co alloy/Zn system has been shown to provide a high rate capacitor, and the NiOOH/Zn system has been shown to provide a high energy battery.

Figure 2:
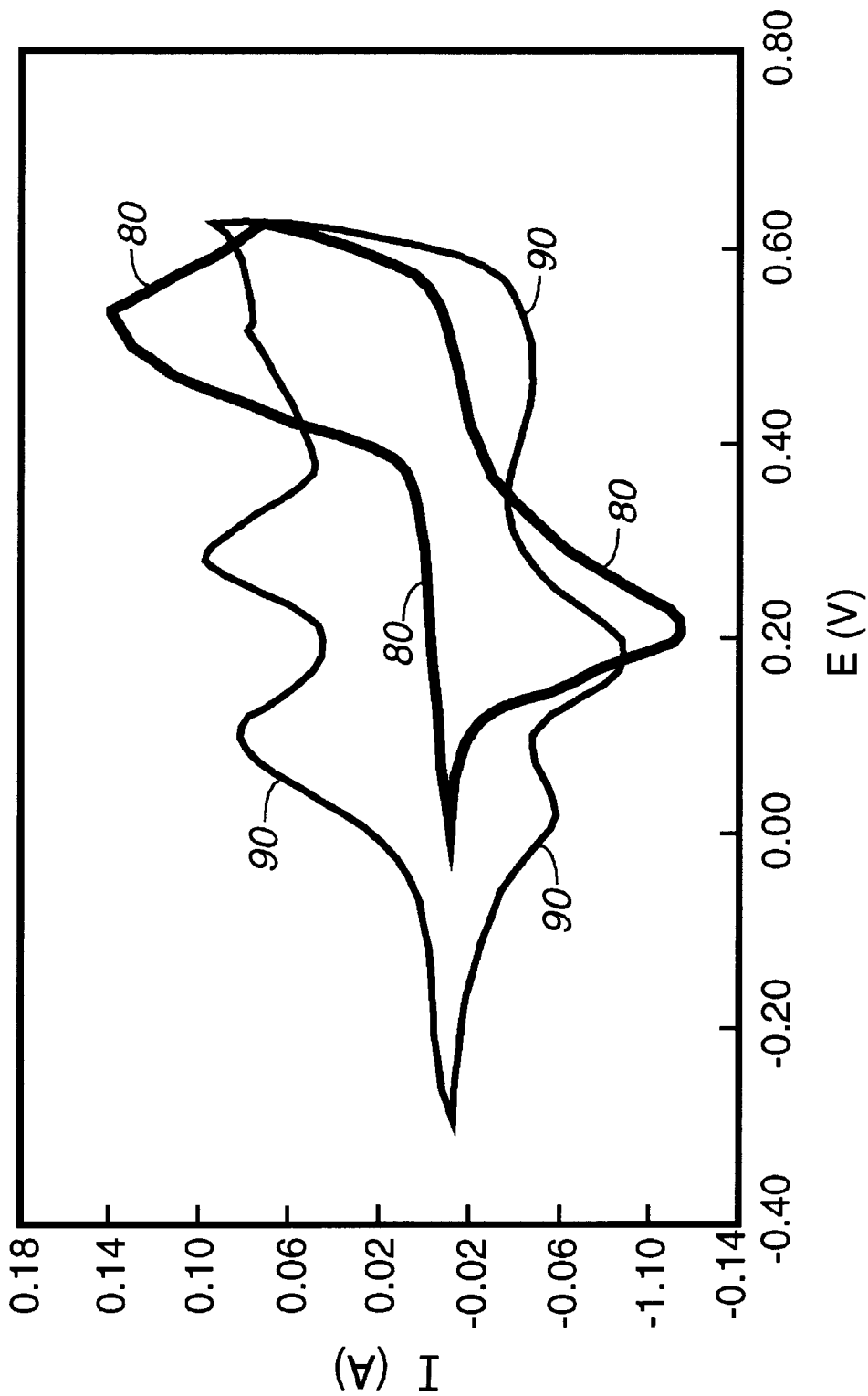
FIG. 2 illustrates curves resulting from cyclic voltammograms of the capacitor and battery portions of the hybrid energy storage system of FIG. 1 in accordance with the present invention.

Typical cyclic voltammograms of the capacitor and the battery scanned at 200 millivolts per second are shown in FIG. 2. The behavior of the Ni—Co alloy electrode, i.e., the capacitor electrode, is shown as curve 90, while the behavior of the NiOOH electrode, i.e., the battery electrode is shown as curve 80. The reference electrode was fabricated of an Hg/HgO material in an electrolyte solution of 30% KOH. It will be appreciated that, while the fully charged NiOOH electrode provides current at 0.6 volts, at the least, against HgO, the Ni—Co alloy electrode is active between 0.0 and 0.6 volts against HgO. When combined with a Zn anode, the NiOOH/Zn pair has a voltage of 1.7 volts, and the Ni—Co/Zn pair has a voltage of 1.5 to 1.6 volts. The Ni—Co alloy electrode has the capability of supplying current when the cell voltage drops below the normal operating voltage, e.g., when the cell voltage reaches 1.6 volts, during high current demand.

The proposed electrical energy storage device can, for instance, include electrode and electrolyte materials fabricated as described in commonly assigned U.S. Pat. No. 5,439,756 issued on Aug. 8, 1995 to Anani et al., entitled "Electrical Energy Storage Device And Method Of Charging And Discharging Same", the disclosure of which is hereby incorporated by reference. Differences between the electrical energy storage device fabricated in accordance with the present invention and that of U.S. Pat. No. 5,439,756 is that the high-energy (e.g., battery) electrode and the high-rate (e.g., capacitor) electrode of the present invention are electrically coupled to result in a two-terminal device that does not require any switching circuitry and that does not require additional terminals extending from the device. Performance characteristics of the electrical energy storage device of the present invention and the device of U.S. Pat. No. 5,439,756, however, are expected to be similar.

Other systems and materials are also envisioned for forming the electrical energy storage device in accordance with the present invention. For instance, in a lithium system, the high energy electrode could be formed from lithiated metal oxide, the common electrode could be formed from carbon, and the high rate electrode could also be formed from lithiated metal oxide. In such a case, the high energy electrode is relatively thicker than the high rate electrode so that the high energy electrode serves as a battery electrode while the high rate electrode serves as a capacitor electrode.

In summary, the hybrid energy storage system as described above is a two-terminal device that includes three electrodes. Specifically, a battery electrode, i.e., an electrode formed with high energy materials, pairs with a common electrode to form a battery portion of the device. A capacitor electrode, i.e., an electrode formed with high rate materials, pairs with the common electrode to form a capacitor portion of the device. The capacitor electrode and the battery electrode are then hooked in parallel within the hybrid device itself. A conductive element coupled to the common electrode functions as a first terminal, while another conductive element coupled to either the battery electrode or the capacitor electrode functions as the second terminal.

The two-terminal hybrid device according to the present invention functions as a single device that includes a battery and a capacitor in parallel. As a result, the hybrid device includes the high capacity of a battery and, like a capacitor, is able to provide high bursts of power. Furthermore, unlike prior art devices, the hybrid device of the present invention does not need external circuitry to switch between its capacitor and battery portions since the battery electrode and the capacitor electrode are electrically coupled together within the package of the hybrid device.

While the preferred embodiments of the invention have been illustrated and described, it will be dear that the invention is not so limited. Numerous modifications, changes, variations, substitutions and equivalents will occur to those skilled in the art without departing from the spirit and scope of the present invention as defined by the appended claims.

What is claimed is:

1. A hybrid energy storage device, comprising:

first, second, and third electrodes;

a first electrolyte disposed between the first and second electrodes; and a second electrolyte disposed between the second and third electrodes;

wherein the first electrode, the first electrolyte, and the second electrode form a battery, wherein the second electrode, the second electrolyte, and the third electrode form a capacitor, and wherein the first and third electrodes are electrically coupled together; and wherein the hybrid energy storage device further comprises a conductor for directly connecting the first and third electrodes.

* * * * *